United States Patent
Murata et al.

(10) Patent No.: US 10,252,935 B2
(45) Date of Patent: Apr. 9, 2019

(54) TEMPERED GLASS PLATE AND PORTABLE TERMINAL USING SAME

(71) Applicant: Nippon Electric Glass Co., Ltd., Shiga (JP)

(72) Inventors: Takashi Murata, Shiga (JP); Fumio Sato, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/021,288

(22) PCT Filed: Sep. 26, 2014

(86) PCT No.: PCT/JP2014/075617
§ 371 (c)(1),
(2) Date: Mar. 11, 2016

(87) PCT Pub. No.: WO2015/050054
PCT Pub. Date: Apr. 9, 2015

(65) Prior Publication Data
US 2016/0221863 A1  Aug. 4, 2016

(30) Foreign Application Priority Data

Oct. 3, 2013 (JP) .................... 2013-208135
Feb. 5, 2014 (JP) .................... 2014-019938

(51) Int. Cl.
C03C 3/093 (2006.01)
C03C 3/085 (2006.01)
(Continued)

(52) U.S. Cl.
CPC .............. *C03C 3/093* (2013.01); *C03C 3/085* (2013.01); *C03C 3/087* (2013.01); *C03C 3/091* (2013.01);
(Continued)

(58) Field of Classification Search
None
See application file for complete search history.

(56) References Cited

U.S. PATENT DOCUMENTS 5,729,387 A    3/1998  Takashashi et al.
9,140,794 B2 *  9/2015  Alameh .............. G01J 1/0407
(Continued)

FOREIGN PATENT DOCUMENTS

CN    102557464    7/2012
JP    8-43199      2/1996
(Continued)

OTHER PUBLICATIONS

Machine Translation of JP 2013195293, Sep. 20, 2013, Nishida et al.*

(Continued)

*Primary Examiner* — David Sample
(74) *Attorney, Agent, or Firm* — Wenderoth, Lind & Ponack, L.L.P.

(57) ABSTRACT

Provided is a tempered glass which is suitable for protection of a display or the like and allows transmission of an infrared ray having a wavelength of from 5 μm to 20 μm. The tempered glass has a compressive stress layer on its surface and has formed therein a through hole penetrating through the tempered glass so as to pass through the surface.

13 Claims, 2 Drawing Sheets

(51) Int. Cl.

| | | |
|---|---|---|
| *C03C 3/091* | (2006.01) | |
| *C03C 21/00* | (2006.01) | |
| *H04M 1/02* | (2006.01) | |
| *G06F 1/16* | (2006.01) | |
| *C03C 3/087* | (2006.01) | |
| *H04M 1/03* | (2006.01) | |

(52) U.S. Cl.
CPC .......... *C03C 21/002* (2013.01); *G06F 1/1626* (2013.01); *H04M 1/0202* (2013.01); *H04M 1/0266* (2013.01); *H04M 1/03* (2013.01)

(56) References Cited

U.S. PATENT DOCUMENTS

| | | | |
|---|---|---|---|
| 2006/0063009 A1 | 3/2006 | Naitou et al. | |
| 2008/0219672 A1* | 9/2008 | Tam | H03K 17/9631 398/130 |
| 2009/0013724 A1* | 1/2009 | Koyo | B23K 26/0093 65/31 |
| 2011/0003619 A1 | 1/2011 | Fujii | |
| 2012/0052252 A1* | 3/2012 | Kohli | C03C 17/23 428/174 |
| 2012/0083401 A1* | 4/2012 | Koyama | C03C 3/085 501/70 |
| 2012/0196071 A1* | 8/2012 | Cornejo | B28D 1/00 428/43 |
| 2012/0214004 A1* | 8/2012 | Hashimoto | C03C 15/00 428/428 |
| 2012/0236477 A1* | 9/2012 | Weber | C03C 21/003 361/679.01 |
| 2013/0001409 A1 | 1/2013 | Tsukagoshi et al. | |
| 2013/0034688 A1* | 2/2013 | Koike | H01L 23/15 428/134 |
| 2013/0177302 A1* | 7/2013 | Weber | G06F 1/1626 396/155 |
| 2013/0319833 A1* | 12/2013 | Lee | H01H 9/02 200/293 |
| 2014/0090864 A1* | 4/2014 | Paulson | C03C 17/225 174/50 |
| 2014/0147624 A1* | 5/2014 | Streltsov | C03C 3/083 428/138 |
| 2014/0182392 A1* | 7/2014 | Woodhull | B24B 37/02 73/851 |
| 2014/0202985 A1 | 7/2014 | Fujii | |

FOREIGN PATENT DOCUMENTS

| | | |
|---|---|---|
| JP | 2006-83045 | 3/2006 |
| JP | 2013-11568 | 1/2013 |
| JP | 2013-108970 | 6/2013 |
| JP | 2013-195293 | 9/2013 |
| WO | 2009/078406 | 6/2009 |

OTHER PUBLICATIONS

International Preliminary Report on Patentability dated Apr. 5, 2016 in International Application No. PCT/JP2014/075617.
International Search Report dated Dec. 22, 2014 in International Application No. PCT/JP2014/075617.
Office Action dated May 10, 2017 in Chinese Application No. 201480031460.9, with translation of the Search Report.

\* cited by examiner

TEMPERED GLASS PLATE AND PORTABLE TERMINAL USING SAME

TECHNICAL FIELD

The present invention relates to a tempered glass and a personal digital assistant using the same, and more specifically, to a tempered glass contrived to allow appropriate transmission of an infrared ray and a personal digital assistant using the same.

BACKGROUND ART

Devices such as a cellular phone, a digital camera, and a personal digital assistant are widely used and show a tendency of further prevalence. Hitherto, in those applications, a resin substrate, such as an acrylic resin substrate, has been used as a protective member for protecting a display. However, owing to its low Young's modulus, the acrylic resin substrate is liable to bend when a display surface of the display is pushed with a pen, a human finger, or the like. Therefore, the resin substrate causes a display failure through its contact with an internal display in some cases. The acrylic resin substrate also involves a problem of being liable to have flaws on its surfaces, resulting in easy reduction of visibility. A solution to those problems is to use a glass sheet as the protective member. The glass sheet (cover glass) is required to (1) have a high mechanical strength, (2) have a low density and a light weight, (3) be able to be supplied at low cost in a large amount, (4) be excellent in bubble quality, (5) have a high light transmittance in a visible region, and (6) have a high Young's modulus so as not to bend easily when its surface is pushed with a pen, a finger, or the like. In particular, a glass sheet that does not satisfy the requirement (1) cannot serve as the protective member, and hence a glass sheet tempered by ion exchange treatment or the like (so-called tempered glass sheet) has been used as the protective member heretofore.

CITATION LIST

Patent Literature

Patent Literature 1: JP 2006-83045 A

SUMMARY OF INVENTION

Technical Problem

In recent years, an infrared sensor configured to control ON/OFF through detection of human motion has been investigated and developed. Such infrared sensor enables the ON/OFF control through detection of the presence or absence of a slight infrared ray radiated from a human body. As an application of such detection technology, in order to reduce power consumption of a device, there has been made an investigation on automatic ON/OFF control of a power source of the device based on a determination made by the infrared sensor whether or not a person is present in front of its screen.

However, when the infrared sensor is used in a personal digital assistant, the detection of an infrared ray having a wavelength of from 5 μm to 20 μm, in particular from 5 μm to 7 μm, is problematic. Specifically, while a cover glass formed of a tempered glass is used for protection of a display in the personal digital assistant, the cover glass does not allow transmission of the infrared ray having a wavelength of from 5 μm to 20 μm, and hence poses an obstacle to infrared ray detection. It should be noted that the adoption of a wavelength region of from 5 μm to 20 μm can increase the sensitivity of the infrared sensor because such wavelength region is a wavelength region in which noise is difficult to be generated.

The present invention has been made in view of the above-mentioned circumstances, and a technical object of the present invention is to devise a tempered glass which is suitable for protection of a display or the like and allows transmission of an infrared ray having a wavelength of from 5 μm to 20 μm.

Solution to Problem

As a result of extensive investigations, the inventors of the present invention have found that the above-mentioned technical object can be achieved by forming a through hole penetrating through a tempered glass so as to pass through a surface (compressive stress layer) of the tempered glass. Thus, the finding is proposed as the present invention. That is, a tempered glass according to one embodiment of the present invention is a tempered glass having a compressive stress layer on its surface, wherein the tempered glass has formed therein a through hole penetrating through the tempered glass so as to pass through the surface. Herein, the "through hole" is not limited to the case of one through hole, and a plurality of "through holes" may be formed for the purpose of, for example, increasing an infrared ray transmitting property.

When the through hole passing through the compressive stress layer in the surface is formed in the tempered glass, and an infrared sensor is arranged beneath the through hole (on one opening side of the through hole), a slight infrared ray radiated from a human body is transmitted through the through hole and can be detected with the infrared sensor, which enables the automatic ON/OFF control of a power source of the device based on a determination made by the infrared sensor whether or not a person is present in front of its screen.

Figure 1:
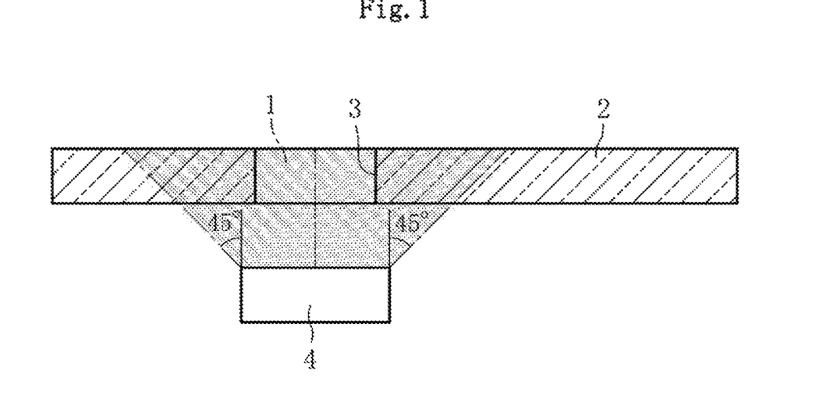
FIG. 1 is a sectional conceptual view for illustrating an infrared ray detection region in a tempered glass.

Secondly, in the tempered glass according to the one embodiment of the present invention, it is preferred that the through hole be formed for making an infrared sensor operative. In addition, for example, in the case where the infrared sensor has an infrared ray detection region having a light receiving angle (angle between the light axis of the infrared sensor and an incident angle) of 45° or less, when the through hole is formed in this region, an infrared ray can be detected with the infrared sensor, and the infrared sensor can be made operative. FIG. 1 is a sectional conceptual view for illustrating an infrared ray detection region 1 (shaded region). In FIG. 1, a through hole 3 penetrating through a compressive stress layer in a surface of a tempered glass (tempered glass sheet) 2 is formed in the tempered glass 2, and an infrared sensor 4 is arranged beneath the tempered glass 2. As can be seen from FIG. 1, the through hole 3 is formed in the infrared ray detection region (grayish region) 1 of the infrared sensor 4 having a light receiving angle of 45° or less.

Thirdly, in the tempered glass according the one embodiment of the present invention, it is preferred that the through hole have arranged therein an infrared ray transmissive member. Herein, the "infrared ray transmissive member" refers to a member having a transmittance (transmittance in a thickness direction) of 10% or more at a wavelength of from 5 μm to 7 μm.

Fourthly, in the tempered glass according to the one embodiment of the present invention, it is preferred that the infrared ray transmissive member be formed of any one of an oxide-based glass, a chalcogenide-based glass, a halogen-based glass, silicon, germanium, ZnSe, ZnS, and polyethylene.

Fifthly, in the tempered glass according the one embodiment of the present invention, it is preferred that the infrared ray transmissive member be adhesively bonded into the through hole with an adhesive.

Sixthly, in the tempered glass according the one embodiment of the present invention, it is preferred that the infrared ray transmissive member be fixed into the through hole through softening deformation of the infrared ray transmissive member and/or the tempered glass.

Seventhly, in the tempered glass according the one embodiment of the present invention, it is preferred that the infrared ray transmissive member be fixed into the through hole at an inside position with respect to a surface of the tempered glass to serve as a viewing side.

Eighthly, it is preferred that the tempered glass according to the one embodiment of the present invention have a total area of an opening of the through hole on one surface of from 0.1 $mm^2$ to 100 $mm^2$. Herein, in the case where a plurality of through holes are formed, the "total area of an opening of the through hole" refers to the total of the areas of their openings.

Ninthly, it is preferred that the tempered glass according to the one embodiment of the present invention have a ratio of [total area of an opening of the through hole on one surface ($mm^2$)]/[thickness (mm)] of from 0.5 to 800.

Tenthly, in the tempered glass according to the one embodiment of the present invention, it is preferred that the through hole have a tapered inner peripheral surface.

Eleventhly, in the tempered glass according the one embodiment of the present invention, it is preferred that the through hole have the tapered inner peripheral surface, the tempered glass be arranged with a surface thereof having a smaller area of an opening of the through hole up, the through hole have arranged therein an infrared ray transmissive member, and the infrared ray transmissive member be supported by a support member from beneath the through hole.

Twelfthly, it is preferred that the tempered glass according to the one embodiment of the present invention have the compressive stress layer in an inner peripheral surface of the through hole. With this, the tempered glass is less liable to break from the through hole.

Thirteenthly, it is preferred that the tempered glass according to the one embodiment of the present invention have a flat sheet shape and have a sheet thickness of 2 mm or less.

Fourteenthly, in the tempered glass according to the one embodiment of the present invention, it is preferred that a compressive stress value and a depth of layer of the compressive stress layer in the surface be 200 MPa or more and 5 μm or more, respectively. The "compressive stress value and depth of layer of the compressive stress layer in the surface" refer to values calculated on the basis of the number of interference fringes observed with a surface stress meter (for example, FSM-6000 manufactured by Toshiba Corporation) and intervals therebetween.

Fifteenthly, it is preferred that the tempered glass according the one embodiment of the present invention comprise as a glass composition, in terms of mass %, 40% to 71% of $SiO_2$, 3% to 30% of $Al_2O_3$, 0% to 10% of $Li_2O$, 7% to 20% of $Na_2O$, and 0% to 15% of $K_2O$.

Sixteenthly, a personal digital assistant according to one embodiment of the present invention comprises the above-mentioned tempered glass.

Seventeenthly, it is preferred that the personal digital assistant according to the one embodiment of the present invention further comprise an infrared sensor arranged so as to correspond to a position of the through hole.

Eighteenthly, it is preferred that the personal digital assistant according to the one embodiment of the present invention further comprise a speaker arranged so as to correspond to a position of the through hole.

DESCRIPTION OF EMBODIMENTS

A tempered glass of the present invention has a compressive stress layer on its surface. As a method of forming the compressive stress layer in the surface, there is given a physical tempering method or a chemical tempering method. Of those, a chemical tempering method is preferably used to form the compressive stress layer in the surface of the tempered glass of the present invention. As the chemical tempering method, preferred is a method comprising introducing alkali ions each having a large ion radius into the surface by ion exchange at a temperature equal to or lower than a strain point, that is, ion exchange treatment. The ion exchange treatment enables appropriate formation of the compressive stress layer in the surface even when the glass has a small thickness, and as a result, desired mechanical strength can be ensured. Further, the tempered glass does not easily break even in its cutting after the formation of the compressive stress layer in the surface, unlike the case of the physical tempering method, such as an air cooling tempering method.

Optimum conditions for the ion exchange treatment may be selected in consideration of, for example, the viscosity characteristics, applications, thickness, and internal tensile stress of the glass. In particular, when K ions in a $KNO_3$ molten salt are ion exchanged with a Na component in the glass, the compressive stress layer can efficiently be formed in the surface of the glass.

The tempered glass of the present invention has formed therein a through hole penetrating through the tempered glass so as to pass through the compressive stress layer in the surface. The total area of an opening of the through hole on one surface is preferably 200 $mm^2$ or less, 150 $mm^2$ or less, 100 $mm^2$ or less, 50 $mm^2$ or less, 30 $mm^2$ or less, 20 $mm^2$ or less, 15 $mm^2$ or less, 10 $mm^2$ or less, 5 $mm^2$ or less, 2 $mm^2$ or less, or 1 $mm^2$ or less, particularly preferably 0.5 $mm^2$ or less. The total area of the opening of the through hole for making an infrared sensor operative on one surface is preferably 200 $mm^2$ or less, 150 $mm^2$ or less, 100 $mm^2$ or less, 50 mm² or less, 30 mm² or less, 20 mm² or less, 15 mm² or less, 10 mm or less, 5 mm² or less, 2 mm² or less, or 1 mm² or less, particularly preferably 0.5 mm² or less. As the total area of the opening of the through hole is smaller, the through hole is less visible, and hence the design property of a personal digital assistant or the like is less liable to be impaired, and moreover, dust, moisture, and the like are less liable to enter a device through the through hole, and hence the reliability of the personal digital assistant or the like is improved. However, when the total area of the opening of the through hole is too small, an infrared ray is hardly transmitted through the tempered glass. Therefore, the total area of the opening of the through hole is preferably 0.1 mm² or more or 0.2 mm² or more, particularly preferably 0.3 mm² or more, and the total area of the opening of the through hole for making the infrared sensor operative is preferably 0.1 mm² or more or 0.2 mm² or more, particularly preferably 0.3 mm² or more.

The total area of the opening of the through hole on one surface may be the same as or different from the total area of an opening of the through hole on the other surface. For example, the through hole may have a tapered inner peripheral surface, and the tempered glass may be arranged with its surface having a larger total area of the opening on an infrared sensor side and its surface having a smaller total area of the opening on a viewing side (outer side). With this, the design property of the personal digital assistant or the like is less liable to be impaired, and moreover, dust, moisture, and the like are less liable to enter the device through the through hole. Alternatively, the through hole may have a tapered inner peripheral surface, and the tempered glass may be arranged with its surface having a smaller total area of the opening on the infrared sensor side and its surface having a larger total area of the opening on the viewing side. With this, an infrared ray can be efficiently transmitted through the through hole. It should be noted that a taper angle (angle deviating from 90°) is preferably from 0.1° to 20° or from 0.5° to 15°, particularly preferably from 1° to 10°.

In the tempered glass of the present invention, the ratio of [total area (mm²) of opening of through hole on one surface]/[thickness (mm)] is preferably 0.5 or more, 1 or more, 3 or more, 5 or more, or 10 or more, particularly preferably 15 or more. When the ratio of [total area (mm²) of opening of through hole on one surface]/[thickness (mm)] is too small, an infrared ray is hardly transmitted through the tempered glass. On the other hand, the ratio of [total area (mm²) of opening of through hole on one surface]/[thickness (mm)] is preferably 800 or less, 600 or less, 500 or less, 300 or less, or 200 or less, particularly preferably 100 or less. When the ratio of [total area (mm²) of opening of through hole on one surface]/[thickness (mm)] is too large, the through hole is more visible, and hence the design property of the personal digital assistant or the like is liable to be impaired. Further, dust, moisture, and the like are liable to enter the device through the through hole, and hence the reliability of the personal digital assistant or the like is liable to lower.

In the tempered glass of the present invention, an infrared ray transmissive member is preferably arranged in the through hole. When an infrared ray transmissive member is arranged in the through hole, dust, moisture, and the like are less liable to enter the device through the through hole, and hence the reliability of the personal digital assistant or the like is improved.

A glass, such as an oxide-based glass, a chalcogenide-based glass, or a halogen-based glass, a metal, such as silicon or germanium, a crystal, such as ZnSe or ZnS, or a resin, such as polyethylene, may be used as the infrared ray transmissive member. Of those, an oxide-based glass is preferred from the viewpoints of external appearance and mechanical strength. The oxide-based glass preferably comprises as a glass composition one kind or two or more kinds of $TeO_2$, $Bi_2O_3$, $Al_2O_3$, and $TiO_2$ as a main component, and the total amount of these components is preferably 20 mol % or more, particularly preferably 30 mol % or more. In addition to the above-mentioned components, an alkali metal oxide, an alkaline earth metal oxide, ZnO, a rare earth oxide, or the like may be added in order to promote vitrification. It should be noted that $SiO_2$, $B_2O_3$, and $P_2O_5$ are each a component that promotes the vitrification but reduces an infrared ray transmittance. Therefore, the total amount of those components is preferably less than 5 mol %, particularly preferably less than 1 mol %.

In the case where the infrared ray transmissive member is arranged in the through hole, it is preferred that the infrared ray transmissive member be arranged so that its surface is flush with a surface of the tempered glass to serve as the viewing side. Alternatively, in order to prevent the breakage of the infrared ray transmissive member, it is also preferred that the infrared ray transmissive member be arranged so that its surface is at an inside position of the through hole (desirably at a position 10 μm or more inside, particularly desirably at a position 100 μm or more inside) with respect to the surface of the tempered glass to serve as the viewing side.

In the tempered glass of the present invention, the infrared ray transmissive member is preferably fixed into the through hole. With this, a situation in which the infrared ray transmissive member escapes from the tempered glass can be prevented. In the case of fixing the infrared ray transmissive member into the through hole, the infrared ray transmissive member is preferably adhesively bonded into the through hole by pouring an adhesive into a gap between the infrared ray transmissive member and the inner peripheral surface of the through hole. An organic resin of, for example, a two-liquid mixing type or an UV-curable type, or an inorganic material, such as a low melting point glass or ceramic, is preferably used as the adhesive. It should be noted that the use of the organic resin facilitates an adhering operation. The use of the inorganic material improves airtightness, and hence moisture and the like are less liable to enter the device through the through hole. The adhesive preferably has a refractive index matched with those of other materials, and particularly preferably has a refractive index comparable to the refractive index $n_d$ of the tempered glass (±0.5). In addition, the adhesive is preferably transparent. When a transparent adhesive is used, the through hole is less visible, and hence the design property of the personal digital assistant or the like is less liable to be impaired.

Further, the infrared ray transmissive member may be fixed into the through hole through softening deformation of the infrared ray transmissive member and/or the tempered glass (preferably of the infrared ray transmissive member). This eliminates the need for the adhesive. In addition, the following may be performed: the through hole is processed to have the tapered inner peripheral surface; the tempered glass is arranged with its surface having a smaller area of the opening of the through hole up; the infrared ray transmissive member is inserted into the through hole from beneath; and the infrared ray transmissive member is supported by a support member from beneath the through hole.

The tempered glass of the present invention preferably comprises as a glass composition, in terms of mass %, 40% to 71% of $SiO_2$, 3% to 30% of $Al_2O_3$, 0% to 10% of $Li_2O$, 7% to 20% of $Na_2O$, and 0% to 15% of $K_2O$. The reason why the content range of each component is limited as described above is described below. It should be noted that the expression "%" refers to "mass %" in the following description of the content range of each component.

$SiO_2$ is a component forming a network of a glass. The content of $SiO_2$ is preferably from 40% to 71%, from 40% to 70%, from 40% to 65%, from 45% to 65%, or from 55% to 64%, particularly preferably from 55% to 62%. When the content of $SiO_2$ is too large, the meltability and formability of the glass are liable to lower, its thermal expansion coefficient becomes too low, and matching of the thermal expansion coefficient with those of peripheral materials becomes difficult. On the other hand, when the content of $SiO_2$ is too small, vitrification becomes difficult. Further, the thermal expansion coefficient becomes large, and the thermal shock resistance of the glass is liable to lower.

$Al_2O_3$ is a component enhancing ion exchange performance, a strain point, and a Young's modulus. The content of $Al_2O_3$ is preferably from 3% to 30%. When the content of $Al_2O_3$ is too large, a devitrified crystal is liable to deposit in the glass and forming by an overflow down-draw method or the like becomes difficult. Further, the thermal expansion coefficient becomes too low, and matching of the thermal expansion coefficient with those of peripheral materials becomes difficult, and its viscosity at high temperature rises, and the meltability is liable to lower. When the content of $Al_2O_3$ is too small, there occurs a risk of no manifestation of sufficient ion exchange performance. From the above-mentioned viewpoints, the upper limit range of $Al_2O_3$ is suitably 28% or less, 26% or less, 24% or less, or 22% or less, particularly suitably 19% or less. In addition, the lower limit range of $Al_2O_3$ is suitably 7.5% or more, 11% or more, 12% or more, 15% or more, 16% or more, or 17% or more, particularly suitably 18% or more.

$Li_2O$ is an ion exchange component, and is also a component lowering the viscosity at high temperature to enhance the meltability and the formability. $Li_2O$ is also a component improving the Young's modulus. Further, $Li_2O$ has a high effect of enhancing the compressive stress value among alkali metal oxides. However, when the content of $Li_2O$ is too large, the liquidus viscosity lowers and the glass is liable to be devitrified. Further, the thermal expansion coefficient becomes too high, and hence the thermal shock resistance lowers, and matching of the thermal expansion coefficient with those of peripheral materials becomes difficult. Further, the viscosity at low temperature is lowered too much and stress relaxation is liable to occur during ion exchange treatment. In that case, the compressive stress values decrease in some cases. Therefore, the content of $Li_2O$ is preferably from 0% to 10%, from 0% to 3.5%, from 0% to 2%, from 0% to 1%, or from 0% to 0.5%, particularly preferably from 0% to 0.1%, and substantially no content, namely, suppression to less than 0.01% is desirable.

$Na_2O$ is an ion exchange component, and is also a component lowering the viscosity at high temperature to enhance the meltability and the formability. Further, $Na_2O$ is also a component improving devitrification resistance. The content of $Na_2O$ is preferably from 7% to 20%, from 10% to 20%, from 10% to 19%, from 12% to 19%, from 12% to 17%, or from 13% to 17%, particularly preferably from 14% to 17%. When the content of $Na_2O$ is too large, the thermal expansion coefficient becomes too high, and hence the thermal shock resistance lowers, and matching of the thermal expansion coefficient with those of peripheral materials becomes difficult. Further, there are tendencies that the strain point lowers too much, and a balance of the glass composition is lacking, thereby lowering the devitrification resistance. On the other hand, when the content of $Na_2O$ is too small, the meltability lower, the thermal expansion coefficient becomes too low, and the ion exchange performance is liable to lower.

$K_2O$ has an effect of promoting ion exchange, and shows a high effect of enlarging a depth of layer, among alkali metal oxides. Further, $K_2O$ is a component lowering the viscosity at high temperature to enhance the meltability and the formability. $K_2O$ is also a component improving the devitrification resistance. The content of $K_2O$ is preferably from 0% to 15%. When the content of $K_2O$ is too large, the thermal expansion coefficient becomes high, the thermal shock resistance lowers, and matching of the thermal expansion coefficient with those of peripheral materials becomes difficult. Further, the strain point lowers too much, and the balance of the glass composition is lacking, thereby making the devitrification resistance of the glass liable to lower. Therefore, the upper limit range of $K_2O$ is suitably 12% or less, 10% or less, 8% or less, 6% or less, 5% or less, 4% or less, or 3% or less, particularly suitably 2% or less.

When the total content of alkali metal oxides $R_2O$ (R represents one or more kinds selected from Li, Na, and K) is too large, the glass is liable to be devitrified, and in addition, the thermal expansion coefficient becomes too high, and hence the thermal shock resistance lowers, and matching of the thermal expansion coefficient with those of peripheral materials becomes difficult. Further, when the total content of $R_2O$ is too large, the strain point lowers too much, and a high compressive stress value is not obtained in some cases. Further, the viscosity around the liquidus temperature lowers, and it becomes difficult to obtain a high liquidus viscosity in some cases. Therefore, the total content of $R_2O$ is preferably 22% or less or 20% or less, particularly preferably 19% or less. On the other hand, when the total content of $R_2O$ is too small, the ion exchange performance and the meltability lower in some cases. Therefore, the total content of $R_2O$ is preferably 8% or more, 10% or more, or 13% or more, particularly preferably 15% or more.

The value of the mass ratio $(Na_2O+K_2O)/Al_2O_3$ is preferably from 0.7 to 2, from 0.8 to 1.6, from 0.9 to 1.6, or from 1 to 1.6, particularly preferably from 1.2 to 1.6. When the value of the mass ratio $(Na_2O+K_2O)/Al_2O_3$ is too large, the viscosity at low temperature excessively lowers, the ion exchange performance lowers, and the Young's modulus lowers. Besides, the thermal expansion coefficient becomes high, and the thermal shock resistance is liable to lower. In addition, the glass composition loses its balance, with the result that the glass is liable to be devitrified. On the other hand, the value of the mass ratio $(Na_2O+K_2O)/Al_2O_3$ is too small, the meltability and the devitrification resistance are liable to lower.

The mass ratio $K_2O/Na_2O$ is preferably from 0 to 2. The compressive stress value and the depth of layer can be adjusted by adjusting the mass ratio $K_2O/Na_2O$. When the compressive stress value needs to be increased preferentially over the depth of layer, the mass ratio $K_2O/Na_2O$ is adjusted to preferably from 0 to 0.5, particularly preferably from 0 to 0.3 or from 0 to 0.2. On the other hand, when the depth of layer needs to be increased preferentially over the compressive stress value or needs to be increased in a short period of time, the mass ratio $K_2O/Na_2O$ is preferably adjusted to from 0.3 to 2, from 0.5 to 2, from 1 to 2, or from 1.2 to 2, particularly preferably from 1.5 to 2. It should be noted that, when the mass ratio $K_2O/Na_2O$ is too large, the glass composition loses its balance, with the result that the glass is liable to be devitrified.

In addition to the components described above, for example, the following components may be introduced.

Alkaline earth metal oxides R'O (R' represents one or more kinds selected from Mg, Ca, Sr, and Ba) are components that may be introduced for various purposes. However, when the total content of R'O is large, the density and the thermal expansion coefficient become high, and the devitrification resistance and the ion exchange performance are liable to lower. Therefore, the total content of R'O is preferably from 0% to 9.9%, from 0% to 8%, or from 0% to 6%, particularly preferably from 0% to 5%.

MgO is a component that lowers the viscosity at high temperature to increase the meltability and the formability, and to increase the strain point and the Young's modulus. MgO has a particularly high effect of improving the ion exchange performance among alkaline earth metal oxides. The content of MgO is preferably from 0% to 6%. However, when the content of MgO is large, the density and the thermal expansion coefficient increase, and the devitrification resistance is liable to lower. Thus, the content of MgO is preferably 4% or less, 3% or less, or 2% or less, particularly preferably 1.5% or less.

CaO is a component that lowers the viscosity at high temperature to increase the meltability and the formability, and to increase the strain point and the Young's modulus. CaO has a particularly high effect of improving the ion exchange performance among alkaline earth metal oxides. The content of CaO is preferably from 0% to 6%. However, when the content of CaO is large, the density and the thermal expansion coefficient increase, and the devitrification resistance and the ion exchange performance lower in some cases. Therefore, the content of CaO is preferably 4% or less, 3% or less, 2% or less, 1% or less, or less than 1%, particularly preferably 0.5% or less.

SrO is a component that lowers the viscosity at high temperature to increase the meltability and the formability, and to increase the strain point and the Young's modulus. When the content of SrO is large, the density and the thermal expansion coefficient increase, and the ion exchange performance and the devitrification resistance are liable to lower. Therefore, the content of SrO is preferably 3% or less, 2% or less, 1.5% or less, 1% or less, 0.5% or less, or 0.2% or less, particularly preferably 0.1% or less.

BaO is a component that lowers the viscosity at high temperature to increase the meltability and the formability, and to increase the strain point and the Young's modulus. When the content of BaO is large, the density and the thermal expansion coefficient increase, and the ion exchange performance and the devitrification resistance are liable to lower. Therefore, the content of BaO is preferably 3% or less, 2.5% or less, 2% or less, 1% or less, 0.8% or less, 0.5% or less, or 0.2% or less, particularly preferably 0.1% or less.

From the viewpoint of improving the ion exchange performance, SrO+BaO (the total content of SrO and BaO) falls within a range of preferably 3% or less, 2.5% or less, 2% or less, 1% or less, or 0.2% or less, particularly preferably 0.1% or less.

ZnO is a component that enhances the ion exchange performance, and is a component that has a high effect of increasing the compressive stress value, in particular. Further, ZnO is a component that has an effect of lowering the viscosity at high temperature without lowering the viscosity at low temperature. However, when the content of ZnO is large, the glass undergoes phase separation, the devitrification resistance lowers, and the density increases. Thus, the content of ZnO is preferably 8% or less, 6% or less, or 4% or less, particularly preferably 3% or less.

The mass ratio $R'O/R_2O$ is preferably 0.5 or less or 0.4 or less, particularly preferably 0.3 or less. When the mass ratio $R'O/R_2O$ is too large, the devitrification resistance is liable to lower.

$SnO_2$ has an effect of improving the ion exchange performance, in particular, the compressive stress value. However, when the content of $SnO_2$ is too large, devitrification due to $SnO_2$ is liable to occur and the glass is liable to be colored. Therefore, the content of $SnO_2$ is preferably from 0.01% to 3% or from 0.01% to 1.5%, particularly preferably from 0.1% to 1%.

$ZrO_2$ is a component that improves the ion exchange performance, the Young's modulus, and the strain point, and simultaneously lowers the viscosity at high temperature. In addition, $ZrO_2$ also has an effect of increasing the viscosity around the liquidus viscosity. Therefore, through introduction of a given amount of $ZrO_2$, the ion exchange performance and the liquidus viscosity can be improved simultaneously. However, when the content of $ZrO_2$ is too large, the devitrification resistance excessively lowers in some cases. Therefore, the content of $ZrO_2$ is preferably from 0% to 10%, from 0.001% to 10%, from 0.1% to 9%, from 0.5% to 7%, or from 1% to 5%, particularly preferably from 2.5% to 5%.

$B_2O_3$ is a component that lowers the liquidus temperature, the viscosity at high temperature, and the density and is also a component that improves the ion exchange performance, in particular, the compressive stress value. However, when the content of $B_2O_3$ is too large, there are risks in that weathering occurs on the surface by ion exchange, the water resistance lowers, and the liquidus viscosity lowers. Further, the depth of layer tends to lower. Therefore, the content of $B_2O_3$ is preferably from 0% to 6% or from 0% to 4%, particularly preferably from 0% to 3%.

$TiO_2$ is a component that improves the ion exchange performance. $TiO_2$ is also a component that lowers the viscosity at high temperature. However, when the content of $TiO_2$ is too large, the glass is colored, the devitrification resistance lowers, and the density increases. Particularly in the case of using the glass as a cover glass for a display, if the content of $TiO_2$ is large, the transmittance is liable to change when the melting atmosphere or raw materials are altered. Therefore, in a process for bonding the tempered glass to a device by utilizing light with an UV-curable resin or the like, ultraviolet irradiation conditions are liable to vary and stable production of the device becomes difficult. Therefore, the content of $TiO_2$ is preferably 10% or less, 8% or less, 6% or less, 5% or less, 4% or less, 2% or less, 0.7% or less, 0.5% or less, or 0.1% or less, particularly preferably 0.01% or less.

$P_2O_5$ is a component that enhances the ion exchange performance, and in particular, is a component that increases the depth of layer. However, when the content of $P_2O_5$ is large, the glass undergoes phase separation, and the water resistance and the devitrification resistance are liable to lower. Thus, the content of $P_2O_5$ is preferably 5% or less, 4% or less, or 3% or less, particularly preferably 2% or less.

As a fining agent, it is preferred to introduce one kind or two or more kinds selected from the group consisting of $As_2O_3$, $Sb_2O_3$, $CeO_2$, F, $SO_3$, and Cl in an amount of from 0.001% to 3%. However, with a view to environmental friendliness, the content of $As_2O_3$ is preferably less than 0.1%, particularly preferably less than 0.01%, and the content of $Sb_2O_3$ is preferably less than 0.1%, particularly preferably less than 0.01%. $CeO_2$ is a component that lowers the transmittance. Therefore, the content of $CeO_2$ is preferably less than 0.1%, particularly preferably less than 0.01%. F is a component that lowers the viscosity at low temperature and lowers the compressive stress value. Therefore, the content of F is preferably less than 0.1%, particularly preferably less than 0.01%. $SO_3$ and Cl are each particularly preferred as the fining agent, and it is preferred to introduce one or both of $SO_3$ and Cl in an amount of from 0.001% to 3%, from 0.001% to 1%, or from 0.01% to 0.5%, particularly from 0.05% to 0.4%.

Rare earth oxides, such as $Nd_2O_3$ and $La_2O_3$, are components that increase the Young's modulus. However, the cost of the raw material itself is high, and when the rare earth oxides are introduced in large amounts, the devitrification resistance is liable to lower. Therefore, the content of the rare earth oxides is preferably 3% or less, 2% or less, 1% or less, or 0.5% or less, particularly preferably 0.1% or less.

Transition metal elements, such as $CoO_3$ and NiO, are components that lower the transmittance. In particular, in the case of using the transition metal elements in a touch panel display, when the content of the transition metal elements is large, the visibility of the tough panel display is impaired. Therefore, the content of the transition metal oxides is preferably 0.5% or less or 0.1% or less, particularly preferably 0.05% or less.

The content of each of PbO and $Bi_2O_3$ is preferably controlled to less than 0.1% with a view to environmental friendliness.

The tempered glass of the present invention has the compressive stress layer in the surface. The compressive stress value of the compressive stress layer in the surface is preferably 200 MPa or more, 300 MPa or more, 500 MPa or more, 600 MPa or more, 700 MPa or more, 800 MPa or more, 900 MPa or more, or 1,000 MPa or more, particularly preferably 1,100 MPa or more. The mechanical strength of the tempered glass increases with an increase in the compressive stress value of the compressive stress layer. However, when a compressive stress layer having an excessively large compressive stress value is formed in the surface, microcracks are generated in the surface, and there is a risk in that the mechanical strength lowers contrarily. In addition, there is a risk in that the stress value of an internal tensile stress layer in the tempered glass excessively increases. Therefore, the compressive stress value of the compressive stress layer is preferably 2,500 MPa or less or 2,000 MPa or less, particularly preferably 1,500 MPa or less. It should be noted that the compressive stress value of the compressive stress layer may be increased by increasing the content of $Al_2O_3$, $TiO_2$, $ZrC_2$, MgO, ZnO, or $SnO_2$, or by reducing the content of SrO or BaO. The compressive stress value may also be increased by shortening an ion exchange time or by reducing the temperature of an ion exchange solution.

The depth of layer of the compressive stress layer in the surface is preferably 5 μm or more, 10 μm or more, 15 μm or more, 20 μm or more, or 30 μm or more, particularly preferably 40 μm or more. As the depth of layer is larger, the tempered glass is less liable to be cracked even when the tempered glass has a deep flaw. However, when the depth of layer of the compressive stress layer is too large, it becomes difficult to cut the tempered glass, and the stress value of the internal tensile stress layer excessively increases, with the result that the tempered glass is liable to break by a mechanical impact. Therefore, the depth of layer of the compressive stress layer is preferably 500 μm or less, 100 μm or less, or 80 μm or less, particularly preferably 60 μm or less. It should be noted that the depth of layer of the compressive stress layer may be increased by increasing the content of $K_2O$, $P_2O_5$, $TiO_2$, or $ZrO_2$, or by reducing the content of SrO or BaO. The depth of layer may also be increased by prolonging the ion exchange time or by increasing the temperature of the ion exchange solution.

The stress value of the internal tensile stress layer is preferably 200 MPa or less, 150 MPa or less, or 100 MPa or less, particularly preferably 50 MPa or less. As the stress value of the internal tensile stress layer is smaller, the tempered glass is less liable to break owing to an internal defect. However, when the stress value of the internal tensile stress layer is too small, the compressive stress value and the depth of layer of the compressive stress layer in the surface lower. Thus, the stress value of the internal tensile stress layer is preferably 1 MPa or more or 10 MPa or more, particularly preferably 15 MPa or more.

The tempered glass of the present invention preferably has a flat sheet shape, and in that case, has a sheet thickness of preferably 2 mm or less, 1.5 mm or less, 1.3 mm or less, 1.1 mm or less, 0.9 mm or less, 0.7 mm or less, 0.5 mm or less, or 0.4 mm or less, particularly preferably from 0.05 mm to 0.3 mm. As the sheet thickness reduces, the weight of the tempered glass can be reduced. It should be noted that when the glass sheet is formed by an overflow down-draw method, a reduction in the thickness of the glass sheet and an increase in its smoothness can be achieved without polishing or etching of the surface.

The tempered glass of the present invention preferably has an unpolished surface, and the unpolished surface has an average surface roughness Ra of preferably 10 Å or less, 5 Å or less, 4 Å or less, or 3 Å or less, particularly preferably 2 Å or less. Herein, the average surface roughness Ra of the surface may be measured by, for example, a method in conformity with SEMI D7-97 "FPD Glass Substrate Surface Roughness Measurement Method." A glass originally has extremely high theoretical strength, but often breaks even under a stress far lower than the theoretical strength. This is because a small flaw called a Griffith flaw is generated in the surface of the glass in a step after glass forming, such as a polishing step. Thus, when the surface is left unpolished, the original mechanical strength of the glass is not impaired, and the glass hardly undergoes breakage. In addition, when the surface of the glass is left unpolished, the polishing step can be omitted, and hence the production cost of the tempered glass can be reduced. In the tempered glass of the present invention, when both surfaces thereof are entirely left unpolished, the tempered glass is still less liable to undergo breakage. In addition, in order to prevent a situation in which breakage occurs from a cut surface (end surface), the cut surface may be subjected to chamfering processing, etching treatment, or the like. It should be noted that, when the glass sheet is formed by an overflow down-draw method, its surface quality can be increased without polishing.

In the tempered glass of the present invention, the liquidus temperature is preferably 1,200° C. or less, 1,050° C. or less, 1,030° C. or less, 1,010° C. or less, 1,000° C. or less, 950° C. or less, or 900° C. or less, particularly preferably 870° C. or less. The liquidus temperature may be lowered by increasing the content of $Na_2O$, $K_2O$, or $B_2O_3$ or reducing the content of $Al_2O_3$, $Li_2O$, MgO, ZnO, $TiO_2$, or $ZrO_2$.

The liquidus viscosity is preferably $10^{4.0}$ dPa·s or more, $10^{4.3}$ dPa·s or more, $10^{4.5}$ dPa·s or more, $10^{5.0}$ dPa·s or more, $10^{5.4}$ dPa·s or more, $10^{5.8}$ dPa·s or more, or $10^{6.0}$ dPa·s or more, particularly preferably $10^{6.2}$ dPa·s or more. The liquidus viscosity may be increased by increasing the content of $Na_2O$ or $K_2O$ or reducing the content of $Al_2O_3$, $Li_2O$, MgO, ZnO, $TiO_2$, or $ZrO_2$.

It should be noted that, as the liquidus viscosity becomes higher and the liquidus temperature becomes lower, the devitrification resistance and the formability become more satisfactory. In addition, when the liquidus temperature is 1,200° C. or less and the liquidus viscosity is $10^{4.0}$ dPa·s or more, the glass sheet can be formed by an overflow down-draw method. Herein, the "liquidus temperature" refers to a value obtained by measuring a temperature at which crystals of glass are deposited after glass powder that passes through a standard 30-mesh sieve (sieve opening: 500 μm), and remains on a 50-mesh sieve (sieve opening: 300 μm) is placed in a platinum boat and then kept for 24 hours in a gradient heating furnace. The "liquidus viscosity" refers to the viscosity of the glass at the liquidus temperature.

In the tempered glass of the present invention, the density is preferably 2.8 g/cm³ or less or 2.6 g/cm³ or less, particularly preferably 2.5 g/cm³ or less. As the density reduces, the weight of the glass can be reduced. Herein, the "density" refers to a value measured by a well-known Archimedes method. It should be noted that the density may be lowered by increasing the content of $SiO_2$, $P_2O_5$, or $B_2O_3$ or reducing the content of an alkali metal oxide, an alkaline earth metal oxide, ZnO, $ZrO_2$, or $TiO_2$. Herein, the "density" may be measured by the well-known Archimedes method.

The thermal expansion coefficient in the temperature range of from 30° C. to 380° C. is preferably from $70 \times 10^{-7}/°$ C. to $110 \times 10^{-7}/°$ C., from $75 \times 10^{-7}/°$ C. to $110 \times 10^{-7}/°$ C., or from $80 \times 10^{-7}/°$ C. to $105 \times 10^{-7}/°$ C., particularly preferably from $85 \times 10^{-7}/°$ C. to $100 \times 10^{-7}/°$ C. When the thermal expansion coefficient is controlled to fall within the range, the thermal expansion coefficient can be easily matched with that of a member such as a metal or an organic adhesive, which can prevent the detachment of the member. Herein, the "thermal expansion coefficient in the temperature range of from 30° C. to 380° C." refers to a value obtained by measuring an average thermal expansion coefficient with a dilatometer. It should be noted that the thermal expansion coefficient may be controlled to fall within the range by adjusting the content of an alkali metal oxide or an alkaline earth metal oxide. Specifically, when the content of the alkali metal oxide or the alkaline earth metal oxide is increased, the thermal expansion coefficient increases, and in contrast, when the content of the alkali metal oxide or the alkaline earth metal oxide is reduced, the thermal expansion coefficient lowers.

The strain point is preferably 500° C. or more, 510° C. or more, 520° C. or more, 540° C. or more, 550° C. or more, 560° C. or more, 580° C. or more, or 600° C. or more, particularly preferably 620° C. or more. As the strain point increases, the heat resistance improves, and hence the compressive stress becomes less liable to disappear even when the tempered glass is subjected to heat treatment. In addition, when the strain point is high, stress relaxation hardly occurs in the ion exchange treatment, and hence a high compressive stress value can be easily obtained. The strain point may be increased by increasing the content of an alkaline earth metal oxide, $Al_2O_3$, $ZrO_2$, or $P_2O_5$ or reducing the content of an alkali metal oxide. Herein, the "strain point" is a value obtained through measurement based on a method of ASTM C336.

The temperature at $10^{2.5}$ dPa·s is preferably 1,650° C. or less, 1,500° C. or less, 1,450° C. or less, 1,430° C. or less, or 1,420° C. or less, particularly preferably 1,400° C. or less. The temperature at $10^{2.5}$ dPa·s corresponds to a melting temperature. Accordingly, as the temperature at $10^{2.5}$ dPa·s reduces, the glass can be melted at a lower temperature. Therefore, as the temperature at $10^{2.5}$ dPa·s reduces, a load on glass manufacturing equipment, such as a melting furnace, reduces and the bubble quality of the glass can be enhanced. As a result, the glass can be manufactured at lower cost. It should be noted that the temperature at $10^{2.5}$ dPa·s may be lowered by increasing the content of an alkali metal oxide, an alkaline earth metal oxide, ZnO, $B_2O_3$, or $TiO_2$ or reducing the content of $SiO_2$ or $Al_2O_3$. Herein, the "temperature at $10^{2.5}$ dPa·s" refers to a value obtained through measurement by a platinum sphere pull up method.

The Young's modulus is preferably 70 GPa or more or 73 GPa or more, particularly preferably 75 GPa or more. When the tempered glass of the present invention is used for a cover glass for a display, as the Young's modulus increases, the amount of deformation upon pressing of the surface of the cover glass with a pen, a finger, or the like reduces, and hence damage to be inflicted on the internal display can be reduced. Herein, the "Young's modulus" may be measured by a well-known resonance method.

A glass according to the present invention has a through hole penetrating through the glass so as to pass through a surface of the glass, and is to be subjected to tempering treatment. The glass comprises as a glass composition, in terms of mass %, preferably 40% to 71% of $SiO_2$, 3% to 30% of $Al_2O_3$, 0% to 3.5% of $Li_2O$, 7% to 20% of $Na_2O$, and 0% to 15% of $K_2O$, more preferably 40% to 71% of $SiO_2$, 7.5% to 25% of $Al_2O_3$, 0% to 2% of $Li_2O$, 10% to 19% of $Na_2O$, 0% to 15% of $K_2O$, 0% to 6% of MgO, 0% to 6% of CaO, 0% to 3% of SrO, 0% to 3% of BaO, 0% to 8% of ZnO, and 0.01% to 3% of $SnO_2$, still more preferably 40% to 71% of $SiO_2$, 13% to 25% of $Al_2O_3$, 0% to 1% of $Li_2O$, 10% to 19% of $Na_2O$, 0% to 10% of $K_2O$, 0% to 6% of MgO, 0% to 6% of CaO, 0% to 3% of SrO, 0% to 3% of BaO, 0% to 8% of ZnO, and 0.01% to 3% of $SnO_2$. The technical features (suitable characteristics, component ranges, and the like) of the glass according to the present invention overlap the technical features of the tempered glass of the present invention. The description of the overlap portions is omitted below.

For example, the glass according to the present invention may be produced as follows: glass raw materials blended so as to have a desired glass composition are loaded into a continuous melting furnace, heated and melted at from 1,500° C. to 1,600° C., and fined; and then the resultant is supplied to a forming apparatus to be formed into a sheet shape, followed by annealing.

An overflow down-draw method is preferably adopted for the forming into a glass sheet. When the glass sheet is formed by the overflow down-draw method, a glass sheet having satisfactory surface quality in an unpolished state can be produced. This is because in the case of the overflow down-draw method, a surface to serve as the surface of the glass sheet is formed in a state of a free surface without being brought into contact with a trough-shaped refractory. Herein, the overflow down-draw method is a method comprising causing molten glass to overflow from both sides of a heat-resistant trough-shaped structure, and subjecting the overflowing molten glasses to down-draw downward while the molten glasses are joined at the lower end of the trough-shaped structure, to thereby produce the glass sheet. The structure and material of the trough-shaped structure are not particularly limited as long as quality that allows use as a glass sheet can be achieved by bringing the dimensions and surface precision of the glass sheet into desired states. In addition, a method for the down-draw downward is not particularly limited. For example, there may be adopted a method comprising rotating a heat-resistant roll having a sufficiently large width in the state of being in contact with a glass ribbon, to thereby draw the glass ribbon, or there may be adopted a method comprising bringing a plurality of paired heat-resistant rolls into contact with only the vicinity of the end surfaces of the glass ribbon, to thereby draw the glass ribbon.

When high surface quality is not required, a method other than the overflow down-draw method may be adopted. For example, a forming method such as a down-draw method (such as a slot down method or a re-draw method), a float method, a roll-out method, or a press method may be adopted. For example, when the glass sheet is formed by the press method, a small-size glass sheet can be efficiently produced.

The tempered glass of the present invention may be produced by forming molten glass to produce a glass, and then forming the through hole in the resultant glass and subjecting the glass to tempering treatment. The glass may be cut into a predetermined size at a timing before the tempering treatment, but when the glass is cut at a timing after the tempering treatment, production cost can be reduced. Ion exchange treatment is preferred as the tempering treatment, and the ion exchange treatment may be performed by, for example, immersing the glass in a $KNO_3$ molten salt at from 400° C. to 550° C. for from 1 hour to 8 hours. Optimum conditions for the ion exchange treatment may be selected in consideration of, for example, the viscosity characteristics, applications, thickness, and internal tensile stress of the glass. The through hole may be formed at a timing after the tempering treatment, but when the through hole is formed at a timing before the tempering treatment, the compressive stress layer can be formed also in the inner peripheral surface of the through hole through the tempering treatment, and as a result, the mechanical strength of the through hole can be increased.

Various methods may be adopted as a method of forming, in the glass, the through hole penetrating through the glass so as to pass through the surface of the glass. For example, there may be adopted a method comprising forming an initial crack on the surface of the glass with a laser so as to give a desired through hole shape, and then rapidly cooling the glass to develop the initial crack in the thickness direction of the glass so as to penetrate through the glass in the thickness direction. In addition, there may also be adopted a method comprising radiating a short pulse laser (for example, femtosecond laser) onto the surface of the glass so as to give a desired through hole shape to promote the volatilization of the components in the thickness direction in an irradiated portion, to thereby finally form the through hole. With this, a micro through hole can efficiently be formed. In addition, there may also be adopted a method comprising subjecting a surface portion other than a portion in which the through hole is to be formed to masking treatment, and then immersing the glass in an etching solution to dissolve the portion not subjected to the masking treatment through etching, to thereby form the through hole. With this, the through hole has a smooth inner peripheral surface, and cracks are less liable to be developed from the through hole. Further, there may also be adopted a method comprising forming, in the glass, the through hole penetrating through the glass so as to pass through the surface of the glass with a drill of a predetermined shape. For example, there may also be adopted a method comprising forming, in the glass, the through hole penetrating through the glass so as to pass through the surface of the glass by using a drilling machine with a drill, and rotating the drill at a predetermined number of revolutions while fixing the glass on a stage with a jig or a resin. With this, the through hole can be easily formed in the glass. It should be noted that, when the stage is moved as required, the shape of the through hole can be adjusted.

In the case of forming the through hole by a mechanical part, it is preferred to subject the inner peripheral surface of the through hole to etching, fire polishing, polishing, or the like. With this, a crack source on the inner peripheral surface of the through hole can be reduced, and cracks are less liable to be developed from the through hole.

The through hole is formed in the glass, and the compressive stress layer is formed through the ion exchange treatment, and then the infrared ray transmissive member may be arranged in the through hole as required. In this case, the infrared ray transmissive member may directly be engaged with the through hole, but as described above, the infrared ray transmissive member is preferably adhesively bonded into the through hole with the adhesive.

A personal digital assistant of the present invention comprises the above-mentioned tempered glass. The technical features of the personal digital assistant of the present invention are partially described in the description section of the tempered glass of the present invention, and their description is omitted below.

It is preferred that the personal digital assistant of the present invention further comprise an infrared sensor arranged so as to correspond to a position of the through hole formed in the tempered glass. With this, a slight infrared ray radiated from a human body is transmitted through the through hole, and can be detected with the infrared sensor.

It is also preferred that the personal digital assistant of the present invention further comprise a speaker arranged so as to correspond to a position of the through hole formed in the tempered glass. This facilitates the detection of voice information with the speaker. It is more preferred that the personal digital assistant of the present invention comprise the infrared sensor and the speaker each arranged so as to correspond to a position of the through hole. This realizes a reduction in the number of through holes, and can simplify a drilling step.

Figure 2A:
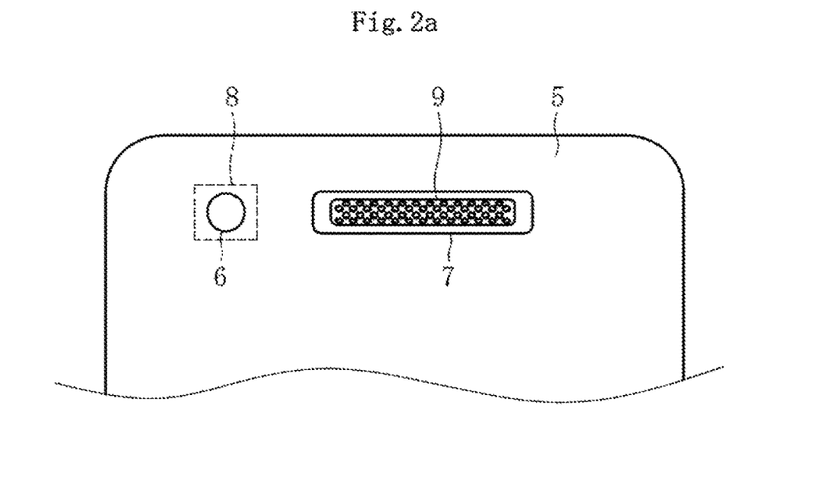
FIG. 2a is a schematic view of the surface of the tempered glass seen from above.
Figure 2B:
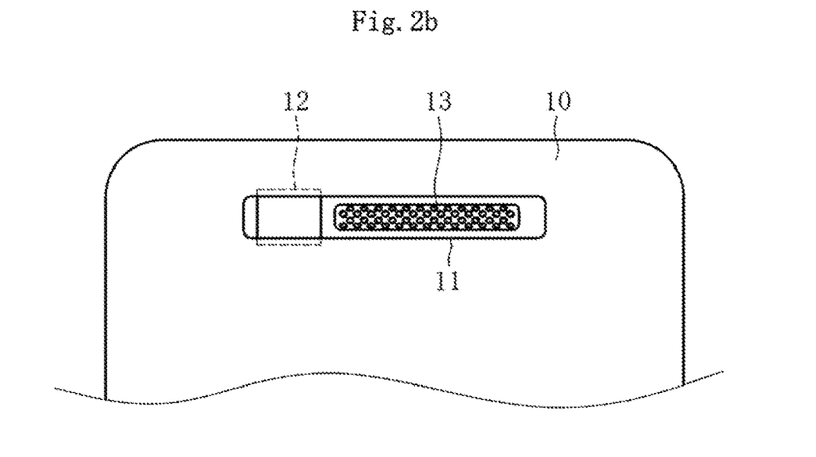
FIG. 2b is a schematic view of the surface of the tempered glass seen from above.

FIG. 2 are each a schematic view of the surface of the tempered glass (tempered glass sheet) seen from above. In FIG. 2a, two through holes 6 and 7 each penetrating through a tempered glass 5 so as to pass through a compressive stress layer in the surface of the tempered glass 5 are formed in the tempered glass 5, an infrared sensor 8 is arranged beneath the tempered glass 5 so as to correspond to the position of the one through hole 6, and a speaker 9 is arranged so as to correspond to the position of the other through hole 7. In FIG. 2b, one through hole 11 penetrating through a tempered glass 10 so as to pass through a compressive stress layer in the surface of the tempered glass 10 is formed in the tempered glass 10, and an infrared sensor 12 and a speaker 13 are each arranged so as to correspond to the position of the through hole 11.

Example 1

The present invention is hereinafter described based on Examples. It should be noted that the present invention is by no means limited to the following Examples. The following Examples are merely illustrative.

In Table 1, Sample Nos. 1 to 9 are shown.

TABLE 1

|  |  | No. 1 | No. 2 | No. 3 | No. 4 | No. 5 | No. 6 | No. 7 | No. 8 | No. 9 |
|---|---|---|---|---|---|---|---|---|---|---|
| Glass composition (wt %) | $SiO_2$ | 57.3 | 61.6 | 66.1 | 66.2 | 65.0 | 61.7 | 61.3 | 58.3 | 62.1 |
|  | $Al_2O_3$ | 13.0 | 18.0 | 14.0 | 13.7 | 16.5 | 19.8 | 12.8 | 24.7 | 21.5 |
|  | $B_2O_3$ | 2.0 | 0.5 | 2.5 | — | — | 3.6 | — | — | — |
|  | $Na_2O$ | 14.5 | 14.5 | 13.4 | 13.7 | 14.7 | 13.2 | 12.3 | 15.3 | 14.7 |
|  | $K_2O$ | 4.9 | 2.0 | 0.6 | 1.9 | — | — | 5.9 | — | — |
|  | MgO | 2.0 | 3.0 | 3.0 | 3.8 | 3.4 | 1.5 | 6.5 | 1.3 | 1.3 |
|  | CaO | 2.0 | — | — | 0.4 | — | — | 0.2 | — | — |
|  | $ZrO_2$ | 4.0 | — | — | — | — | — | 1.0 | — | — |
|  | $SnO_2$ | 0.3 | 0.4 | 0.4 | 0.3 | 0.4 | 0.2 | — | 0.4 | 0.4 |
| $\rho$ (g/cm$^3$) |  | 2.54 | 2.45 | 2.42 | 2.44 | 2.44 | 2.40 | 2.48 | 2.45 | 2.43 |
| Pa (° C.) |  | 517 | 564 | 542 | 555 | 597 | 575 | 555 | 670 | 647 |
| Ta (° C.) |  | 558 | 613 | 587 | 603 | 648 | 629 | 602 | 729 | 706 |
| Ts (° C.) |  | 762 | 863 | 821 | 840 | 893 | 905 | 826 | 1,009 | 985 |
| $10^4$ dPa·s (° C.) |  | 1,098 | 1,255 | 1,222 | 1,219 | 1,273 | 1,325 | 1,171 | 1,318 | 1,316 |
| $10^3$ dPa·s (° C.) |  | 1,276 | 1,460 | 1,439 | 1,421 | 1,476 | 1,534 | 1,354 | 1,574 | 1,593 |
| $10^{2.5}$ dPa·s (° C.) |  | 1,392 | 1,591 | 1,578 | 1,549 | 1,610 | 1,679 | 1,477 | 1,693 | 1,713 |
| $\alpha_{30-380}$ (×$10^{-7}$/° C.) |  | 99.9 | 91.2 | 79.4 | 88.7 | 82.7 | 76.4 | 95.7 | 85.0 | 84.0 |
| TL (° C.) |  | 918 | 970 | 910 | 900 | 1,045 | 985 | 1,107 | 1,181 | 1,081 |
| log$\eta$TL (dPa·s) |  | 5.5 | 6.3 | 6.5 | 6.8 | 5.8 | 6.6 | 4.5 | 5.6 | 6.5 |
| E (GPa) |  | 75 | 71 | 70 | 71 | 70 | 66 | 73 | 71 | 70 |
| CS (MPa) [430° C.-4 h] |  | 844 | 914 | 735 | 782 | 913 | 900 | 819 | 1,311 | 1,233 |
| DOL (μm) [430° C.-4 h] |  | 33 | 46 | 33 | 41 | 41 | 41 | 41 | 50 | 45 |

Each sample was produced as described below. First, glass raw materials were blended so as to have the glass composition in the table, and the resultant was melted at 1,580° C. for 8 hours using a platinum pot. After that, the molten glass was poured onto a carbon sheet so as to be formed into a sheet shape. Thus, a glass sheet was obtained. The resultant glass was evaluated for various characteristics.

The density is a value obtained through measurement by a well-known Archimedes method.

The strain point Ps and the annealing point Ta are values obtained through measurement based on a method of ASTM C336.

The softening point Ts is a value obtained through measurement based on a method of ASTM C338.

The temperatures at viscosities at high temperature of $10^{4.0}$ dPa·s, $10^{3.0}$ dPa·s, and $10^{2.5}$ dPa·s are values obtained through measurement by a platinum sphere pull up method.

The liquidus temperature TL is a value obtained through measurement of a temperature at which crystals of glass are deposited after glass powder passes through a standard 30-mesh sieve (sieve opening: 500 μm), and remains on a 50-mesh sieve (sieve opening: 300 μm) is placed in a platinum boat and then kept for 24 hours in a gradient heating furnace. The liquidus viscosity log ηTL refers to a viscosity of each glass at the liquidus temperature.

The Young's modulus is a value obtained through measurement by a flexural resonance method.

The thermal expansion coefficient α is a value obtained through measurement of an average thermal expansion coefficient in a temperature range of from 30° C. to 380° C. using a dilatometer.

Each sample was subjected to ion exchange treatment by being immersed in a $KNO_3$ bath retained at 430° C. for 4 hours. After the ion exchange treatment, the compressive stress value CS and depth of layer DOL of a compressive stress layer in a surface were measured. The compressive stress value CS and depth of layer DOL of the compressive stress layer were calculated on the basis of the number of interference fringes observed with a surface stress meter (for example, FSM-6000 manufactured by Toshiba Corporation) and intervals therebetween. In the calculation, the refractive index and optical elastic constant of Sample No. 1 were set to 1.52 and 28 [(nm/cm)/MPa], respectively, the refractive index and optical elastic constant of Sample No. 7 were set to 1.51 and 28 [(nm/cm)/MPa], respectively, and the refractive index and optical elastic constant of any other sample were set to 1.50 and 30 [(nm/cm)/MPa], respectively.

Example 2

Figure 3:
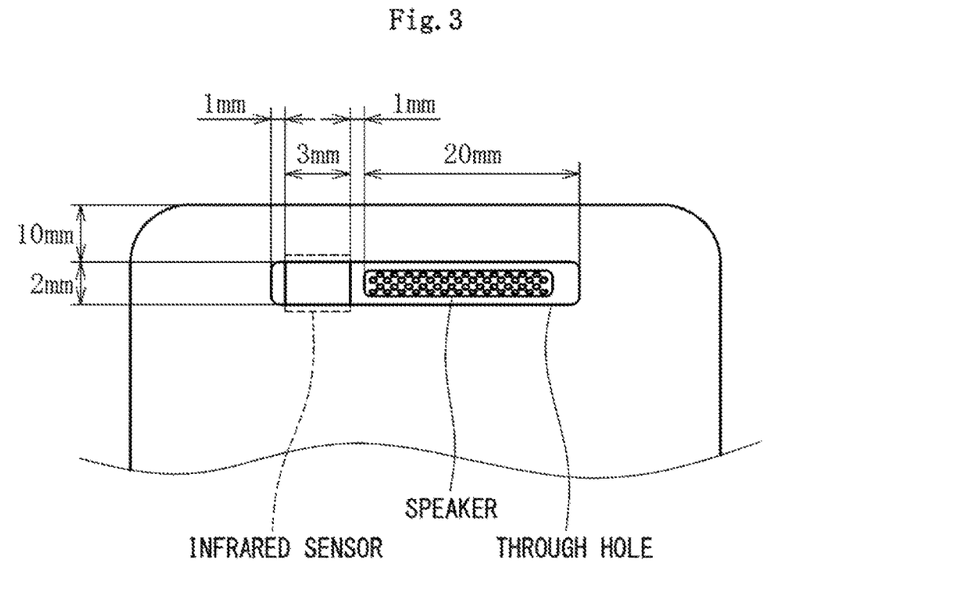
FIG. 3 is a view for illustrating the dimensions of a through hole formed in a tempered glass sheet in [Example 2].

Glass raw materials were blended so as to have the glass composition of Sample No. 2, followed by melting, fining, supplying, and then forming by an overflow down-draw method, and cutting. Thus, a glass sheet having a thickness of 0.7 mm was obtained. A through hole (total area: about 50 mm$^2$) penetrating through the glass sheet so as to pass through the surface of the glass sheet was formed in the glass sheet by using a predetermined drill, and then the inner peripheral surface of the through hole was subjected to polishing processing, and a cut surface of the glass sheet was subjected to corner cutting (in a surface direction) and chamfering processing (in a thickness direction). Subsequently, the resultant glass sheet was immersed in a $KNO_3$ bath retained at 430° C. for 4 hours, to yield a tempered glass sheet. Finally, predetermined printing treatment was performed on a surface of the tempered glass sheet to serve as an infrared sensor side, and then an infrared sensor and a speaker were arranged beneath the tempered glass sheet. In this case, the through hole had such a shape that the speaker was entirely seen and the infrared sensor was partially seen from above the tempered glass sheet. Further, the infrared sensor was arranged so as to be spaced 1 mm apart from the tempered glass sheet. FIG. 3 is a view for illustrating the dimensions of the through hole formed in the tempered glass sheet in [Example 2]. It should be noted that a tempered glass sheet having a through hole can similarly be produced by using the materials of Sample Nos. 1 and 3 to 9 while the material of Sample No. 2 was used in [Example 2].

Example 3

A tempered glass sheet (sheet thickness: 0.7 mm) having a through hole having a diameter of φ5 mm was produced by using the material of Sample No. 2 by the same method as in [Example 2]. Next, predetermined printing treatment was performed on a surface of the tempered glass sheet to serve as an infrared sensor side, and then an infrared sensor was arranged beneath the through hole, and a $TeO_2$-based glass was mounted into the through hole. The $TeO_2$-based glass comprised as a glass composition 80 mol % of $TeO_2$ and 20 mol % of ZnO, had a disc shape having a diameter of φ4.9 mm and a thickness of 0.5 mm, and had its both surfaces mirror finished. It should be noted that also the outer peripheral surface of the infrared ray transmissive member is preferably mirror polished in view of an external appearance. In the mounting of the $TeO_2$-based glass, the $TeO_2$-based glass having the disc shape was arranged at the center position of the through hole, and then an UV-curable resin was injected into a gap between the $TeO_2$-based glass and the through hole and cured with UV light, and thus the $TeO_2$-based glass was adhesively bonded into the through hole. It should be noted that a protrusion of the adhesive from the through hole is preferably removed before the UV curing, or removed after the UV curing by mechanical polishing.

Example 4

A tempered glass sheet having a through hole having a diameter of φ5 mm on a surface to serve as a viewing side was produced by using the material of Sample No. 2 by the same method as in [Example 2]. The through hole was processed to have a tapered inner peripheral surface with a taper angle of 2°. It should be noted that the through hole had a shape gradually extending from the surface to serve as the viewing side to a surface to serve as an infrared sensor side in a thickness direction. Next, predetermined printing treatment was performed on the surface of the tempered glass sheet to serve as the infrared sensor side, and then an infrared sensor was arranged beneath the through hole, and a $TeO_2$-based glass was mounted into the through hole. The $TeO_2$-based glass comprised as a glass composition 80 mol % of $TeO_2$ and 20 mol % of ZnO, had an outer diameter dimension approximately equal to the inner diameter dimension of the through hole, that is, had a tapered surface with a taper angle of 2° in the thickness direction, and had its both surfaces mirror finished. In the mounting of the $TeO_2$-based glass, in order to support the $TeO_2$-based glass without using the adhesive, a support member was mounted onto the surface of the through hole to serve as the infrared sensor side, to thereby fix the $TeO_2$-based glass into the through hole.

Figure 4:
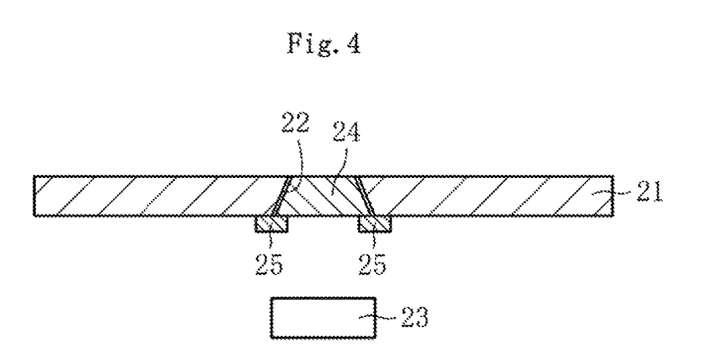
FIG. 4 is a sectional conceptual view for illustrating an embodiment mode according to [Example 4].

FIG. 4 is a sectional conceptual view for illustrating an embodiment mode according to [Example 4]. As is apparent from FIG. 4, a through hole 22 penetrating through a tempered glass sheet 21 so as to pass through a compressive stress layer in the surface of the tempered glass sheet 21 is formed in the tempered glass sheet 21, and an infrared sensor 23 is arranged beneath the through hole 22. In addition, the through hole 22 has a tapered inner peripheral surface, and the tempered glass sheet 21 is arranged with its surface having a smaller hole area of the through hole 22 up and with its surface having a larger hole area of the through hole 22 down. In addition, an infrared ray transmissive member 24 ($TeO_2$-based glass) is arranged in the through hole 22 of the tempered glass sheet 21, and the infrared ray transmissive member 24 is processed to have a tapered outer peripheral surface so as to be approximately matched with the tapered surface of the through hole 22. The infrared ray transmissive member 24 is inserted into the through hole 22 from beneath the through hole 22, and then supported by support members 25 from beneath the through hole 22 to be fixed into the through hole 22.

Example 5

A $TeO_2$-based glass was adhesively bonded into the through hole in the same manner as in [Example 3] except that the thickness of the $TeO_2$-based glass was changed to 0.4 mm. In [Example 5], the $TeO_2$-based glass had a small thickness, and hence the $TeO_2$-based glass was adhesively bonded into the through hole so that its surface was at an inside position of the through hole by only 100 μm with respect to a surface of the tempered glass to serve as a viewing side (at a position only 100 μm lower than the surface).

Figure 5:
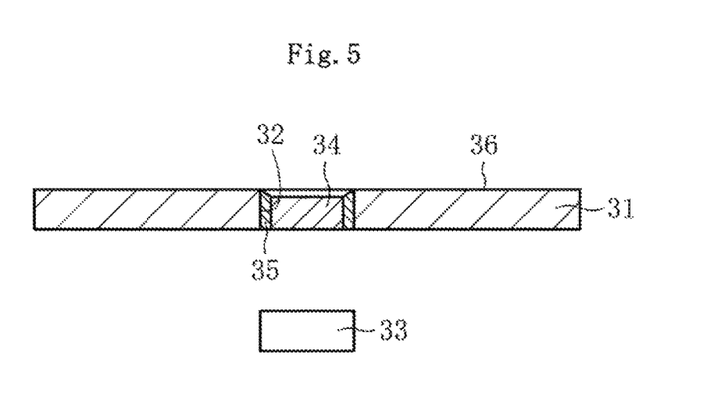
FIG. 5 is a sectional conceptual view for illustrating an embodiment mode according to [Example 5].

FIG. 5 is a sectional conceptual view for illustrating an embodiment mode according to [Example 5]. As is apparent from FIG. 5, a through hole 32 penetrating through a tempered glass sheet 31 so as to pass through a compressive stress layer in the surface of the tempered glass sheet 31 is formed in the tempered glass sheet 31. An infrared sensor 33 is arranged beneath the through hole 32, and an infrared ray transmissive member 34 ($TeO_2$-based glass) is arranged in the through hole 32 of the tempered glass sheet 31. The infrared ray transmissive member 34 is fixed to an inside of the through hole 32 of the tempered glass sheet 31 with an adhesive (UV-curable resin) 35. In addition, the infrared ray transmissive member 34 is adhesively bonded to the tempered glass sheet 31 to serve as a viewing side so that a surface of the infrared ray transmissive member 34 is at a position only 100 μm lower than a surface 36 of the tempered glass sheet 31.

INDUSTRIAL APPLICABILITY

The tempered glass sheet of the present invention is suitable for a cover glass for a cellular phone, a digital camera, a PDA, or the like. The tempered glass sheet of the present invention can be expected to find use in applications requiring high mechanical strength, for example, a window glass, a substrate for a magnetic disk, a substrate for a flat panel display, a substrate for a touch panel display, a cover glass for a solar cell, a cover glass for a solid image pick-up element, and tableware, in addition to the above-mentioned applications.

REFERENCE SIGNS LIST 1 infrared ray detection region
2, 5, 10 tempered glass
3, 6, 7, 11, 22, 32 through hole
4, 8, 12, 23, 33 infrared sensor
9, 13 speaker
21, 31 tempered glass sheet
24, 34 infrared ray transmissive member
25 support member
36 surface to serve as viewing side

The invention claimed is:
1. A tempered glass having a compressive stress layer on its surface,
   wherein the tempered glass has formed therein a through hole penetrating through the tempered glass so as to pass through the surface;
   wherein an inner peripheral surface of the through hole is a tapered surface whose opening area increases from one side toward the other side in the thickness direction over the full length in the thickness direction of the tempered glass;

wherein the tapered surface of the through hole is a polished surface;

wherein the tempered glass has the compressive stress layer in the tapered surface of the through hole wherein the through hole is formed for making an infrared sensor operative, wherein the through hole has arranged therein an infrared ray transmissive member, and wherein the infrared ray transmissive member is formed of any one of an oxide-based glass, a chalcogenide-based glass, a halogen-based glass, silicon, germanium, ZnSe, ZnS, and polyethylene.

2. The tempered glass according to claim 1, wherein the infrared ray transmissive member is adhesively bonded into the through hole with an adhesive.

3. The tempered glass according to claim 1, wherein the infrared ray transmissive member is fixed into the through hole through softening deformation of the infrared ray transmissive member and/or the tempered glass.

4. The tempered glass according to claim 1, wherein the infrared ray transmissive member is fixed into the through hole at an inside position with respect to a surface of the tempered glass to serve as a viewing side.

5. The tempered glass according to claim 1, wherein the tempered glass has a total area of an opening of the through hole on one surface of from 0.1 $mm^2$ to 100 $mm^2$.

6. The tempered glass according to claim 1, wherein the tempered glass has a ratio of [total area of an opening of the through hole on one surface ($mm^2$)]/[thickness (mm)] of from 0.5 to 800.

7. The tempered glass according to claim 1, wherein the tempered glass is arranged with a surface thereof having a smaller total area of an opening of the through hole up, the through hole has arranged therein an infrared ray transmissive member, and the infrared ray transmissive member is supported by a support member from beneath the through hole.

8. The tempered glass according to claim 1, wherein the tempered glass has a flat sheet shape and has a sheet thickness of 2 mm or less.

9. The tempered glass according to claim 1, wherein a compressive stress value and a depth of layer of the compressive stress layer in the surface are 200 MPa or more and 5 µm or more, respectively.

10. The tempered glass according to claim 1, wherein the tempered glass comprises as a glass composition, in terms of mass %, 40% to 71% of $SiO_2$, 3% to 30% of $Al_2O_3$, 0% to 10% of $Li_2O$, 7% to 20% of $Na_2O$, and 0% to 15% of $K_2O$.

11. A personal digital assistant, comprising the tempered glass of claim 1.

12. The personal digital assistant according to claim 11, further comprising an infrared sensor arranged so as to correspond to a position of the through hole.

13. The personal digital assistant according to claim 12, further comprising a speaker arranged so as to correspond to a position of the through hole.

* * * * *